April 29, 1952 F. S. FLICK 2,594,548
AUTOMATIC CONTROL FOR MACHINES
Filed May 31, 1946 3 Sheets-Sheet 1

Inventor
Francis S. Flick
By
Chritton, Schroeder, Merriam & Hofgren
Attorneys

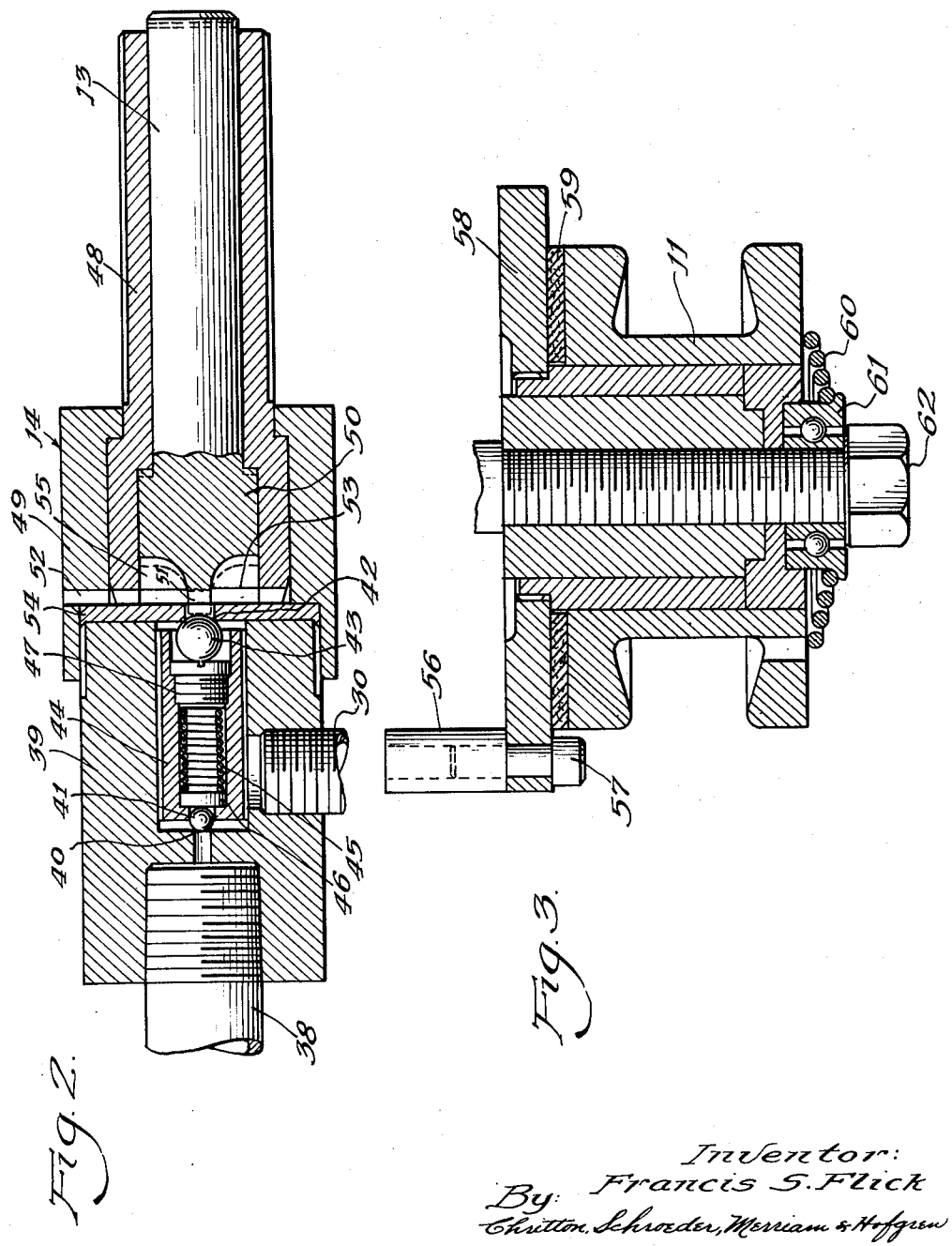

April 29, 1952 F. S. FLICK 2,594,548
AUTOMATIC CONTROL FOR MACHINES
Filed May 31, 1946 3 Sheets-Sheet 3

Inventor:
Francis S. Flick
By: Chritton, Schroeder, Merriam & Hofgren
Attorneys

Patented Apr. 29, 1952

2,594,548

UNITED STATES PATENT OFFICE 2,594,548

AUTOMATIC CONTROL FOR MACHINES

Francis S. Flick, Chicago, Ill., assignor of two-thirds to M. M. Flick and one-third to N. Reedy Application May 31, 1946, Serial No. 673,652

9 Claims. (Cl. 29—68)

This invention relates to a fully automatic control for a machine having a movable operating head and more particularly to mechanism for advancing fresh stock into operative position, gripping the stock of material, lowering the head to perform an operation and automatically raising the head when the operation is finished.

The primary object of the invention is to provide an improved automatic control for a cutting machine wherein the stock of metal may be cut up into the desired lengths without requiring the constant attention of an operator.

Another object of the invention is to provide an automatic control for a metal band saw wherein an air control valve is operated by the material moving into cutting position, and the head is moved up and down by means of a special air cylinder which is controlled by the valve.

The invention is illustrated in a preferred embodiment in the accompanying drawings, in which—

Figure 1:
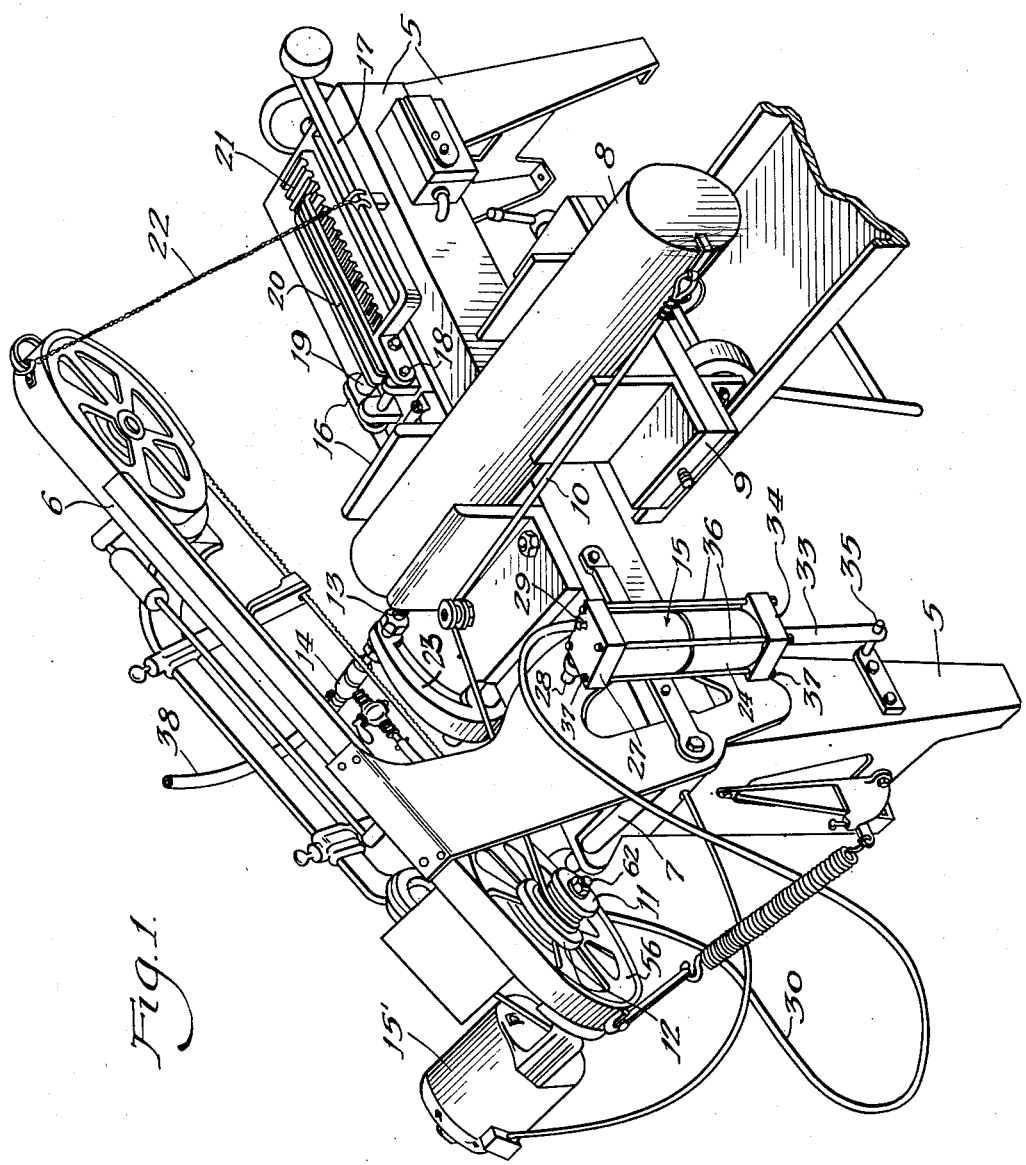

Figure 1 is a perspective view of the metal band saw equipped with the fully automatic control; Fig. 2, a plan sectional view of the air valve; Fig. 3, a fragmentary plan sectional view of the winding drum and friction clutch which advances the material to cutting position; and Fig. 4, a longitudinal sectional view of the air cylinder and piston.

In the embodiment illustrated, the metal band saw has a main frame or bed 5, on which is pivotally mounted a cutting head 6, as indicated at 7. A piece of metal stock 8 may be supported on a carriage 9, so that the stock is urged into cutting position by a cord 10 connected to a winding pulley 11, mounted on a friction clutch 12 on one of the wheels of the band saw. Travel of the bar 8 is limited by a push rod stop 13 which controls an air valve 14 which directs the flow of air into and out of the cylinder member 15. The metal band saw is of conventional construction and may be driven by an electric motor 15'.

In order to hold the stock of material in proper position during the cutting operation, an automatic clamping device 16 is provided. A weighted arm 17 is pivoted at 18 to the movable jaw of the clamping member, and also carries a pivot 19 on a toggle link 20 which has a sharpened end portion to engage a rack 21 on the main frame. A chain 22 may connect the movable head 6 of the machine to the clamping arm 17, so that as the head raises slightly from the position shown in Fig. 1, the grip on the stock 8 is released so that it is free to move forwardly and depress the push rod 13 of the valve member 14. When the head is lowered to begin the next cutting operation, the clamping device will automatically grip the material.

Figure 4:
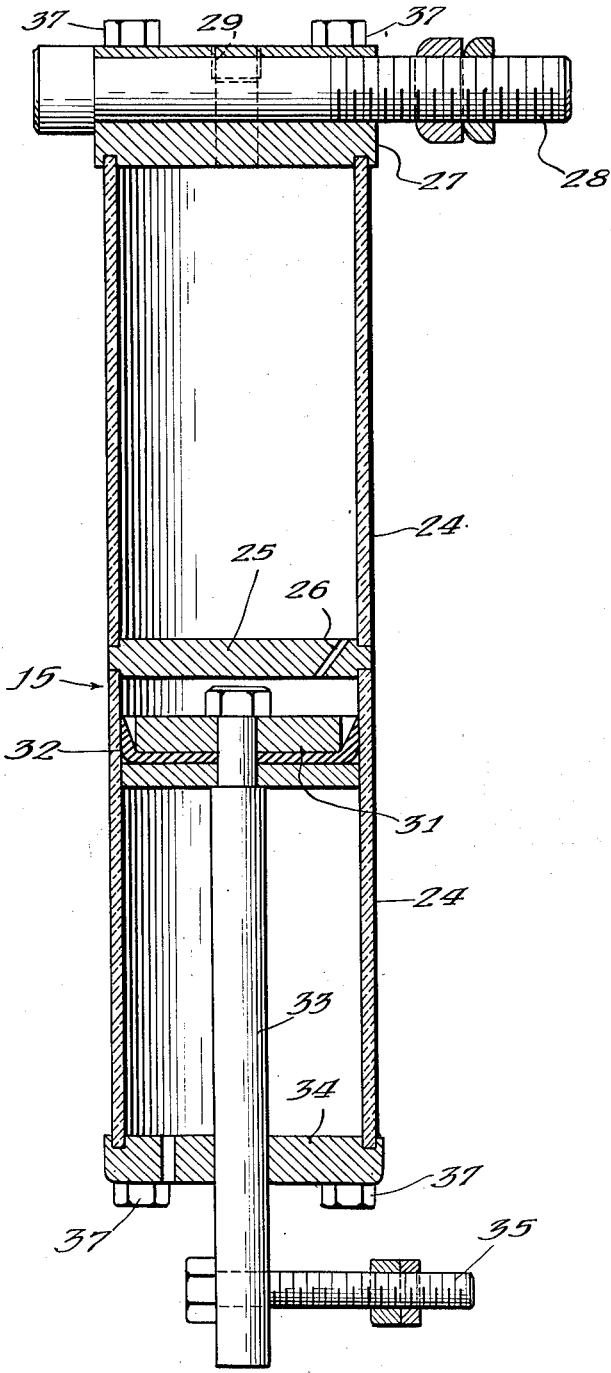

The air cylinder 15 is best shown in Fig. 4, and is made up of two tubular sections 24 which fit against a wall member 25 provided with a small aperture 26. The top cylinder head 27 is provided with a bolt 28, so that it may be secured to the movable head 6 of the machine. This cylinder head is also provided with connections 29 for an air hose 30 which communicates with the valve member 14. The cylinder contains a piston 31 having the usual leather packing 32 and a piston rod 33 which extends through a cylinder head 34 and is pivotally connected by a bolt 35 to the main frame 5 of the machine. The air cylinder and heads are all held assembled by means of tie rods 36 provided with nuts 37. Preferably a liquid such as oil always fills the space in the lower cylinder between the piston 31 and the wall member 25, so that when high pressure air is admitted to the hose 30 the movement of the head 6 will not be violent. Also, when the air pressure is released, and the head is permitted to swing down into cutting position by gravity, the oil passing through the orifice 26 will slow up the movement, so that the teeth of the saw will not be damaged when they first come into contact with the stock.

The air valve 14 is shown in Fig. 2, and has an inlet hose 38 which preferably carries a pressure of 60 to 100 pounds per square inch. The main body 39 of the valve is tubular and affords an inlet port 40 which may be closed by a ball 41. The other end of the chamber is provided with an exhaust port 42 which is closed by a ball 43. A hollow guide member 44, having fluted sides partially embraces the balls 41 and 43. The guide member contains a compression spring 45, having one end which bears against a loose disk 46, and the other end against a threaded plug 47.

The push rod 13 is slidably mounted in a tubular sleeve 48 which is secured to the main body 39 of the valve by means of a coupling 49. The sleeve 48 is secured to an arm 23 of the machine and supports the valve. The inner end of the push rod has an enlarged head portion 50 and a finger 51 which extends through the exhaust port to engage the ball 43. The coupling 49 has an exhaust aperture 52 to atmosphere, which communicates with the exhaust port 42. The dotted lines in Fig. 2 show the position of the push rod when it first becomes effective to open the exhaust port. Its inward travel is limited by shoulders 53 abutting against the disk 54 which provides the exhaust port. Part of the head of the push rod is cut away, as indicated at 55, so that the push rod will not seal off the port 52.

In operation, the end which has been sawed from the stock 8 drops off and permits the push rod 13 to assume the position shown in Fig. 2. Air pressure from the line 38 will force the ball 41 off of its seat and urge the guide member 44 to the right, as viewed in Fig. 2. This permits air to pass from the pipe 38 to the cylinder 15 through the hose 30 and the air pressure on the piston 31 will cause the operating head to raise from cutting position.

The upward movement of the operating head 6 releases the clamping device, and the stock 8 is drawn inwardly until stopped by the push rod 13. When the push rod 13 is depressed, the ball 43 opens the port 52, so that air from the cylinder 15 can flow to atmosphere and permit the operating head to swing down by gravity into cutting position. It will be noted that when the ball 43 is thrust inwardly it moves the carrier member 44 to the left and closes the inlet port 40. However, the ball 41 is cushioned against the thrust of the push rod by the disk 46 and spring 45, so that it will not be damaged. The cycle of operations will continue and will cut up the stock 8 into desired lengths automatically.

In Figs. 1 and 3 a winding drum 11 is shown to exert a constant tension on the cord 10 and urge the stock into cutting position. It will be understood that other means may be used to feed the stock, such as a gravity feed, but the friction device shown is preferred. In this mechanism power is transmitted from the band saw wheel by means of a rotating socket member 56, which through a pin 57 drives a friction plate 58. A leather washer 59 is provided between the winding drum and plate 58, and the winding drum is yieldingly urged against it by means of a compression spring 60, which abuts against a roller bearing 61, which is held on the shaft 62 of the band saw wheel.

The foregoing detailed description is given for clearness of understanding only, and no unnecessary limitations should be understood therefrom, for some modifications will be obvious to those skilled in the art.

I claim:

1. In a cutting machine for cutting an elongated work piece into shorter lengths, work-feed control means comprising, an air operated piston and cylinder one of which is substantially stationary and the other is movable, a valve member for directing compressed air into and out of said cylinder, and a slidable push rod mounted in alignment with a work piece and the valve member, said push rod being adapted to be moved by contact with a work piece moving into operative position to operate the valve member to exhaust compressed air from the cylinder to lower said first mentioned movable member while a portion of the work piece is being cut off, said push rod receding from the valve member when the cut-off portion of the work piece falls away from the push rod, to stop said exhaust action whereby compressed air will be introduced into the cylinder to elevate said first mentioned movable member.

2. A cutting machine as claimed in claim 1, in which the valve member has a spring pressed inlet valve for admitting air into the cylinder and an outlet valve for discharging said cylinder, and the push rod when moved by the work-piece acts to open the outlet valve and simultaneously increase the spring pressure on the inlet valve.

3. A cutting machine as claimed in claim 1, in which the valve member has opposed inlet and exhaust ports which are closed by a pair of balls arranged in tandem relation and separated by a hollow guide member, and a compression spring serves as a cushion for one of said balls.

4. In a cutting machine for cutting an elongated work piece into shorter lengths, work-feed control means comprising, a fluid operated piston and cylinder one of which is substantially stationary and the other is movable with relation thereto, a valve member for directing fluid under pressure into and out of said cylinder, and a push rod slidably connected with said valve member, said push rod being mounted in the path of a work piece moving into operative position so as to be moved by contact with work piece, said valve member having opposed inlet and exhaust ports which are closed by a pair of balls arranged in tandem relation and separated by a hollow guide member having a compression spring urging the balls apart, said push rod having a finger extending through said exhaust port to engage one of said balls.

5. A power saw as claimed in claim 1, in which the cylinder is divided into two chambers by a partition having a small orifice communicating with both chambers, and liquid is provided in said cylinder to be forced through said orifice when the piston is moved.

6. An automatic work-feed control for a cutting machine, comprising an air cylinder and piston one of which is substantially stationary and the other is movable, a valve member for controlling the flow of compressed air into and out of said cylinder, a push rod slidably connected with said valve member and positioned in the path of a work piece so as to be moved by a moving piece of work to actuate the valve member for exhausting said cylinder, said push rod being spring pressed outwardly to close the cylinder exhaust when out of contact with a work-piece:

7. Apparatus as claimed in claim 6, in which the valve member has opposed inlet and exhaust ports which are closed by a pair of balls arranged in tandem relation and separated by a hollow guide member having a compression spring urging the balls apart; and the push rod has a finger extending through said exhaust port to engage one of said balls.

8. An automatic work-feed control for a cutting machine, comprising a fluid operated cylinder and piston one of which is substantially stationary and the other is movable, a valve member having an inlet port and an exhaust port and a tubular connection with the interior of the cylinder whereby said valve member controls the flow of fluid under pressure into and out of the cylinder, and a push rod slidably connected with said valve member and aligned with and in the path of a movement of a work piece so as to be moved longitudinally by a work-piece to exhaust the cylinder and move said first mentioned movable member in one direction and when free of contact with a work-piece to close said exhaust and cause fluid under pressure to enter the cylinder and move said first mentioned movable member in the opposite direction.

9. In a cutting machine for cutting an elongated work piece into shorter lengths, work-feed control means comprising, a fluid operated piston and cylinder one of which is adapted to be mounted on a stationary portion of the machine and the other is adapted to be mounted on a movable portion of the machine, a valve member for directing compressed air into and out of said cylinder, a longitudinally slidable push-rod in alignment with said valve member and a work piece, said push-rod being adapted to be moved by contact with a work piece moving into operative position to operate the valve member to exhaust compressed air from the cylinder to lower said movable portion of the machine while a portion of the work piece is being cut off, said push-rod, when a cut-off portion of the work piece falls away therefrom, receding from the valve member to stop said exhaust action and cause compressed air to be introduced into the cylinder to elevate said movable portion of the machine, and means for moving the work piece longitudinally into contact with the push-rod.

FRANCIS S. FLICK.

REFERENCES CITED

The following references are of record in the file of this patent:

UNITED STATES PATENTS

| Number | Name | Date |
| --- | --- | --- |
| 1,201,244 | Blum | Oct. 17, 1916 |
| 1,760,985 | Jimerson | June 3, 1930 |
| 1,972,327 | Blum | Sept. 4, 1934 |
| 2,049,626 | Rasmussen | Aug. 4, 1936 |
| 2,144,335 | Jensen et al. | Jan. 17, 1939 |

FOREIGN PATENTS

| Number | Country | Date |
| --- | --- | --- |
| 800,123 | France | Apr. 20, 1936 |